Patented Sept. 7, 1926.

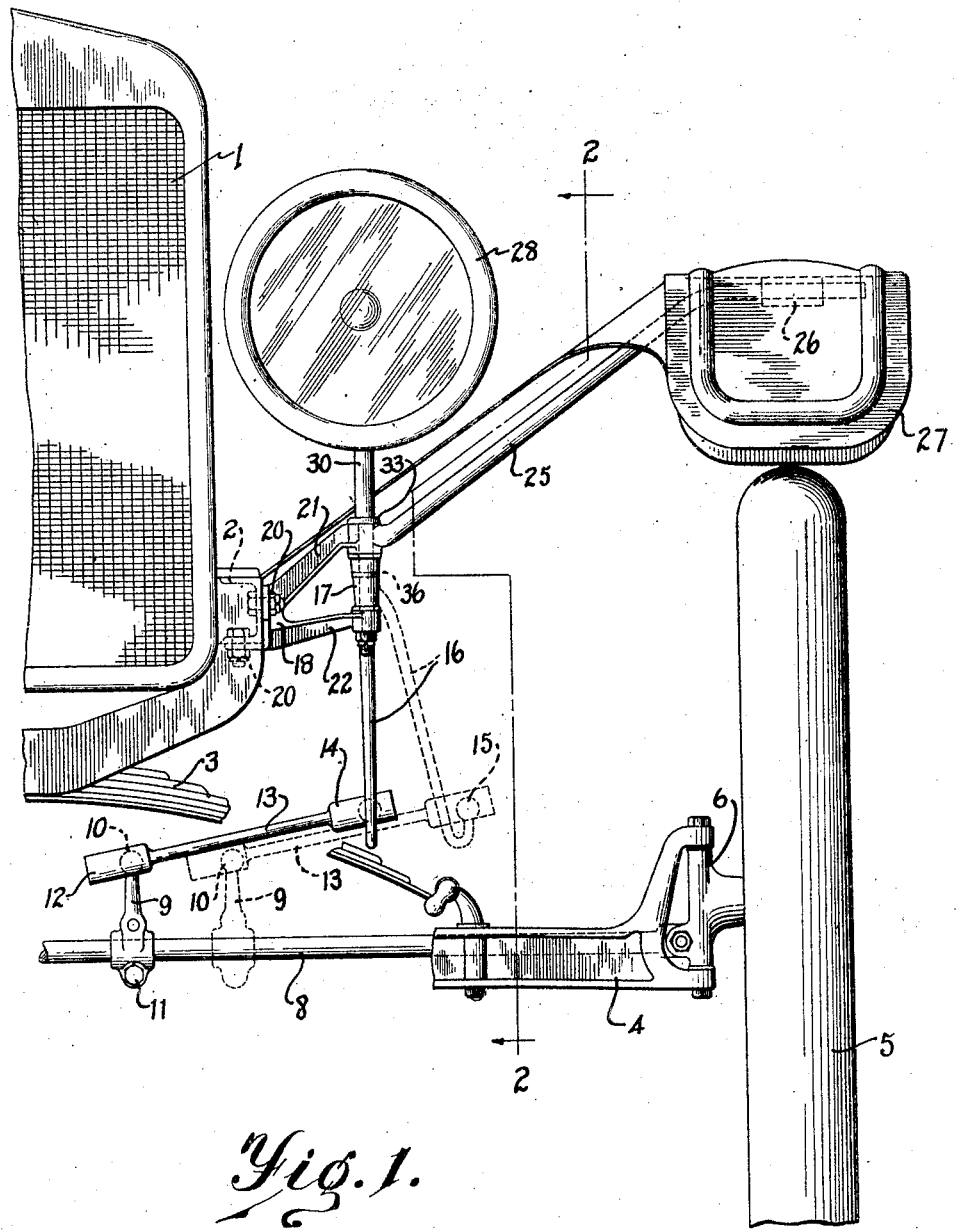

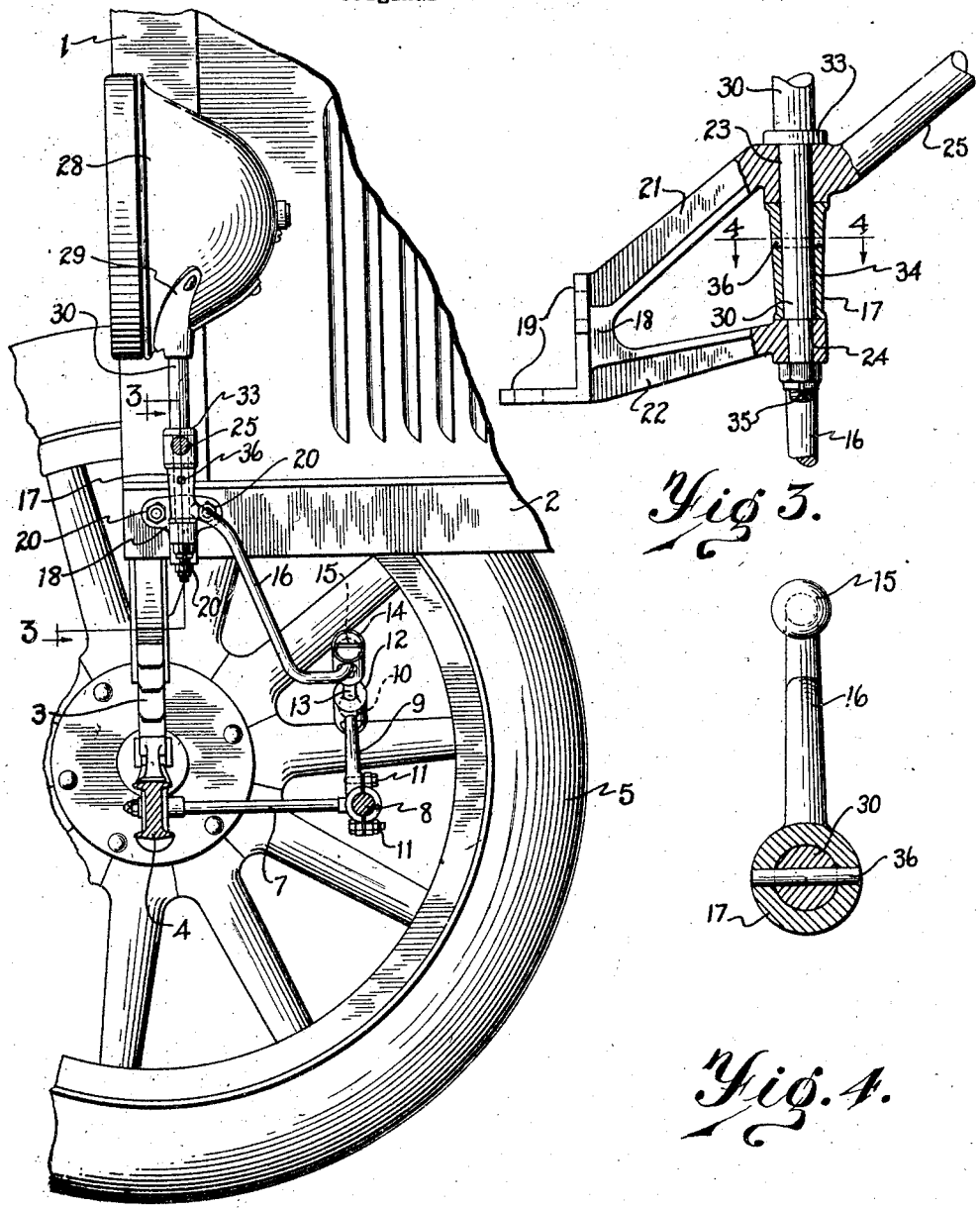

1,598,735

UNITED STATES PATENT OFFICE.

WALTER L. LORANGER, OF HIGHLAND PARK, MICHIGAN.

DIRIGIBLE HEADLIGHT.

Application filed March 27, 1922, Serial No. 547,217. Renewed May 22, 1926.

This invention relates to dirigible headlights for automobiles, and the object of the invention is to provide a simple, inexpensive and efficient apparatus for turning the headlights of an automobile in a direction coinciding with the direction in which the steering wheel is turned in order to light the roadway in front of the vehicle. This device is particularly useful when turning corners on dark country roads in that the roadway which the vehicle is approaching is lighted so that all obstructions can be seen before they are encountered. Another object of the invention is to provide a device of the character described by means of which a lamp mounted on the body or chassis of the vehicle may be operated by a portion of the steering mechanism carried by the axle whereby the lamp is maintained comparatively free from road shock by reason of being carried on the spring-supported chassis or body. These objects and the several novel features of the invention are hereinafter more fully described and claimed, and the preferred form of construction is shown in the accompanying drawings in which—

Fig. 1 is a front view of an automobile provided with my improved dirigible headlight mounted thereon.

Fig. 2 is a section taken on line 2—2 of Fig. 1.

Fig. 3 is an enlarged section taken on line 3—3 of Fig. 2.

Fig. 4 is an enlarged section taken on line 4—4 of Fig. 3.

As shown in Fig. 1, the automobile is provided with a radiator 1 mounted on a chassis 2 shown in dotted lines in Fig. 1 and the chassis is supported by means of a spring 3 on an axle 4 having wheels 5 rotatably mounted on a member 6 which is pivoted in each end of the axle as will be readily understood. The members 6 are each provided with a rearwardly extending arm 7 rigidly connected thereto and a steering arm 8 extends across and is pivotally connected to the ends of the arms 7. The steering mechanism, as is the usual practice, is connected with the rod 8 and by turning the steering wheel, the rod 8 is moved longitudinally to turn the forward wheels of the vehicle in either direction. A bracket 9 having a ball end 10 is clamped to the rod 8 by means of the bolts 11 and, as shown more particularly in Fig. 1, the end 12 of an arm 13 is secured over and pivoted on the ball end 15 of a depending arm 16 which, as shown more particularly in Fig. 2, is formed integrally with a sleeve 17. As shown in Fig. 3, a bracket 18 is provided having flat faces 19 adapted to fit the channel shaped frame or chassis 2 of the vehicle and is bolted thereto by the bolts 20 as shown in Fig. 1. The bracket 18, as shown in Fig. 3, is provided with two extending ribbed arms 21 and 22 which are provided with apertures 23 and 24 therethrough in vertical alignment. Formed integrally with the arm 21 is a round arm 25 which, as shown in Fig. 1, extends upwardly and is secured in a supporting bracket 26 for the fender 27. The head lamp 28, as shown in Fig. 2, is provided with a bracket 29 secured thereto in which the shaft 30 for supporting the lamp is welded or otherwise secured. The shaft 30 may have any desired form as may be required with different types of lamp construction. As shown in Fig. 3, the shaft 30 is provided with a flange 33 which rests on the arm 21 about the aperture 22. The sleeve 17 is positioned between the ends of the arms 21 and 22 and the shaft 30 extends through the aperture 23 of the arm 21, through the central aperture 34 of the sleeve 17 and through the aperture 24 of the arm 23 and a nut is threaded onto the end of the shaft 30 to hold the shaft in place, a cotter key 35 being provided to prevent removal of the nut. In this manner the shaft 30 is rotatably mounted in the arms 21 and 22 and the sleeve 17 is secured to the shaft 30 by means of a pin 36 extending through both the sleeve and the shaft. By this arrangement when the depending arm 16 is turned the sleeve 17 is also turned thus turning the shaft 30 which is pinned thereto. The parts are identically the same for the lights on the opposite sides of the vehicle, the parts being merely removed for the light on the opposite side to that shown in Fig. 1.

In operation the device is assembled as shown and upon turning the steering wheel the rod 8 is moved to the right or left of Fig. 1 to turn the forward wheels 5 correspondingly. In Fig. 1 the movement of the rod 8 to the right is indicated in dotted lines, the bracket 9 being moved to the right by the said movement of the rod which moves the arm 13 to the right and turns the depending arm 16 as shown. This movement of the arm 16 turns the sleeve 17 and the shaft 30 which is pinned thereto, and thus turns the headlight in a direction coinciding with the direction of the wheels 5. By this arrangement the headlight will illuminate the road ahead of the wheels 5 in all directions that the said wheels may be turned and provides a simple and efficient device for accomplishing this result. By loosening the bolts 11 which clamp the brackets 9 to the rod 8, the members 9 may be adjusted longitudinally of the said rod so that the lamps may be adjusted to throw a beam of light in a plane parallel with the plane of the wheels 5. By this arrangement the lamps may be easily adjusted at any time without disturbing the arrangement of the several parts in relation one to the other.

From the foregoing description it becomes evident that the device is very simple and efficient in operation; is composed of few parts, and is of consequent low manufacturing cost, may be easily adjusted and provides a device which accomplishes the objects described.

Having thus fully described my invention, its utility and mode of operation, what I claim and desire to secure by Letters Patent of the United States is—

1. In a dirigible headlight for automobiles having a steering arm for turning the forward wheels thereof, a bracket adapted to be secured to the chassis of the automobile and having a pair of extending arms provided with apertures in vertical alignment, the upper of said arms having a support formed integrally therewith for an automobile fender, a sleeve positioned between the ends of the said arms and having a central aperture in vertical alignment with the apertures of the arms, a shaft extending through the aperture of the arm and the spindle, a headlight secured to the upper end of the shaft, a flange on the shaft limiting downward movement thereof, a nut on the end of the shaft preventing upward movement thereof, means for securing the shaft to the spindle, an arm depending from the said spindle and having a ball end, a bracket adjustably secured to the steering arm and having a ball end, and an arm pivotally mounted on and connecting the ball ends of the bracket and depending arm of the spindle respectively.

2. In a dirigible headlight for automobiles having a steering arm for turning the forward wheels thereof, a bracket adapted to be secured to the chassis of the automobile and having a pair of extending arms in vertical alignment, the upper of said arms having an integral extending portion providing a fender support, a vertical shaft rotatably mounted in the said arms, means preventing longitudinal movement of the shaft through the said arms, a headlight secured to the upper end of the shaft, a spindle secured to the shaft between the arms provided with a depending arm formed integrally therewith having a ball end, a bracket adjustably secured to the steering arm and having a ball end, and an arm pivotally mounted on and connecting the ball ends of the bracket and depending arm of the spindle respectively.

In testimony whereof, I sign this specification.

WALTER L. LORANGER.